(12) United States Patent
Lu et al.

(10) Patent No.: US 8,725,909 B2
(45) Date of Patent: May 13, 2014

(54) METHOD FOR IDENTIFYING HOST OPERATING SYSTEM BY UNIVERSAL SERIAL BUS (USB) DEVICE

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 95 days.

(21) Appl. No.: 13/639,875

(22) PCT Filed: Jun. 27, 2011

(86) PCT No.: PCT/CN2011/076444
§ 371 (c)(1),
(2), (4) Date: Oct. 8, 2012

(87) PCT Pub. No.: WO2012/000417
PCT Pub. Date: Jan. 5, 2012

(65) Prior Publication Data
US 2013/0042029 A1 Feb. 14, 2013

(30) Foreign Application Priority Data
Jun. 29, 2010 (CN) .......................... 2010 1 0213961

(51) Int. Cl.
*G06F 3/00* (2006.01)
(52) U.S. Cl.
USPC .................... 710/16; 710/10; 710/11; 710/15
(58) Field of Classification Search
None
See application file for complete search history.

(56) References Cited

U.S. PATENT DOCUMENTS

| 7,574,534 B2 * | 8/2009 | Bolan et al. ...................... 710/15 |
| 2009/0248907 A1 * | 10/2009 | Huang et al. .................... 710/10 |
| 2012/0054372 A1 * | 3/2012 | Chen et al. ....................... 710/13 |

* cited by examiner

*Primary Examiner* — Ernest Unelus
*Assistant Examiner* — Ronald Modo
(74) *Attorney, Agent, or Firm* — Hammer & Associates, P.C.

(57) ABSTRACT

A method for identifying a host operating system by a Universal Serial Bus (USB) device is disclosed, which pertains to the field of information security. The method includes: A) the USB device is powered on and initiated; B) it is determined whether the first setup packet is a first preset command, if yes, C is performed, if not, D is performed; C) it is determined whether the seventh byte of the first preset command is a second preset value, if yes, an operating system identification is set as a first preset identification, and F is performed, otherwise, E is performed; D) it is determined whether the first setup packet is a second preset command, if yes, the operating system identification is set as a second preset identification, and F is performed, otherwise, E is performed; E) information interaction with the host is performed according to a default operating system identification until the last setup packet is received, and it is determined whether the last setup packet is a third preset command, if yes, the operating system identification is set as a third preset identification, if not, the operating system identification is set as a fourth preset identification; F) information interaction with the host is performed according to the present operating system identification, and then it waits to receive the instructions issued by the host.

16 Claims, 1 Drawing Sheet

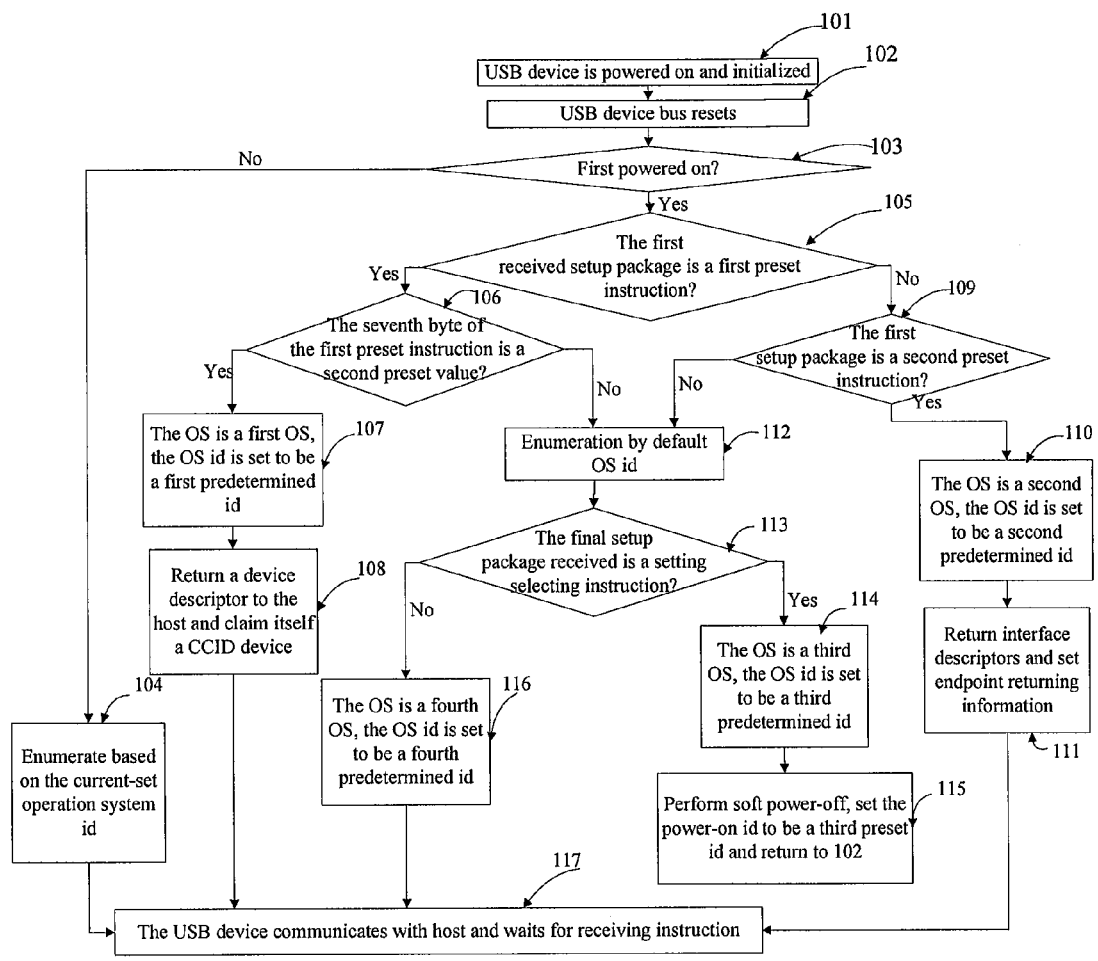

METHOD FOR IDENTIFYING HOST OPERATING SYSTEM BY UNIVERSAL SERIAL BUS (USB) DEVICE

TECHNICAL FIELD

The present invention relates to a method for interconnecting or transferring information or signal between an input/output device and a central processor in information security field, in particular to a method for identifying a host operating system by a USB device.

BACKGROUND OF THE INVENTION

USB protocol is a universal serial bus standard for connecting a host with a peripheral, being widely used in a host, such as a personal computer, a personal digital assistant, and a mobile computer, etc. It supports hot-plug, instant plug-and-play and bus power supply. Almost all peripherals such as a mouse, a keyboard, a game handler, a scanner, a digital camera, a printer, a hard disk, a security device, a disc, and a net card can connect to and communicate with a host by running a USB interface which has become a default interface between a peripheral and a computer.

In aspect of operating system platform support, Windows operating system such as Windows 98, Windows 2000, Windows XP, Windows Vista, and Windows 7, etc, Apple operating system, and Linux operating system all support USB interface. With increase in number of peripherals of a computer with USB interface, it requires a computer to be more supportable of a USB interface and USB device to be more efficient in identifying a host operating system.

SUMMARY OF THE INVENTION

To solve the aforesaid problem, a method for identifying a host operating system by a USB device is disclosed, including the following steps:

Step A, a USB device is powered on and initialized;

Step B, the USB device determines whether a first setup package received is a first preset instruction, if yes, Step C is executed; if no, Step D is executed;

Step C, the USB device determines whether the seventh byte of the first preset instruction is a second preset value, if yes, the operating system ID is set to be a first preset ID and Step F is executed; if no, Step E is executed;

Step D, the USB device determines whether the first setup package is a second preset instruction, if yes, the operating system ID is set to be a second preset ID and Step F is executed; if no, Step E is executed;

Step E, the USB device keeps communicating with a host according to a default operating system ID till it receives a final setup package, and determines whether the final setup package is a third preset instruction, if yes, the operating system ID is set to be a third preset id, if no, the operating system ID is set to be a fourth preset id; and Step F, the USB device interacts with the host according to a current operating system id, establishes communication with the host and waits for receiving instructions sent by the host.

The USB device being initialized includes initializing a power-on ID to be a first preset value and setting the operating system ID to be a default id.

The Step F further includes that the USB device determines whether the current operating system ID is concurrent with the default id, if yes, the USB device communicates with the host and waits for receiving instruction sent by the host; if no, the USB device executes soft power off, sets the power-on ID to be a third preset value and Step A is executed.

Following Step A, the method further includes determining whether the USB device is powered on for the first time, if yes, Step B is executed, or if no, Step F is executed by the USB device.

The determining whether the USB device is powered on for the first time includes determining whether the power-on ID is the first preset value, if yes, the USB device is powered on for the first time, or if no, the USB device is not powered on for the first time.

The first preset instruction is a device descriptor obtaining instruction.

The USB device determining whether the first setup package is the first preset instruction includes that the USB device determines whether the first setup package starts with a hexadecimal number 80 06, if yes, the first setup package is the first preset instruction, or if no, the first setup package is not the first preset instruction.

The second preset value is a hexadecimal number Ox08.

The second preset instruction is a device address allocating instruction.

The USB device determining whether the first setup package is the second preset instruction includes that the USB device determines whether the first setup package starts with a hexadecimal number 00 05, if yes, the first setup package is the second preset instruction, or if no, the first setup package is not the second preset instruction.

The final setup package is the first instruction received by the USB device after it receives descriptor obtaining information.

The descriptor obtaining information includes a device descriptor obtaining instruction, an interface descriptor obtaining instruction, an endpoint descriptor obtaining instruction, and a setting descriptor obtaining instruction.

The third preset instruction is a setting selecting instruction.

The USB device determining whether the final setup package is the third preset instruction includes that the USB device determines whether the final setup package starts with a hexadecimal number 00 09, if yes, the final setup package is the third preset instruction, or if no, the final setup package is not the third preset instruction.

The USB device analyses any instructions sent by the host for determining a type of the host operating system, and after the determination, returns corresponding data to the host which makes the host identify the USB device exactly.

The method further includes that the first preset identifier refers to a first operating system, the second identifier refers to a second operating system, the third identifier refers to a third operating system, and the fourth identifier refers to a fourth operating system.

The first operating system is an Apple operating system, the second operating system is a Linux2.4 or Linux 2.6.10 and prior to 2.6.10 kernel system, the third operating system is an after-2.6.10 kernel system, and the fourth operating system is a Windows operating system.

Advantages: USB device analyzes any instructions sent by a host for determining a type of the host operating system and returns related data to the host which makes the host identifies the USB device exactly.

DESCRIPTIONS OF THE ACCOMPANYING DRAWINGS OF THE INVENTION

FIG. 1 is a flow chart of a method for identifying a host operating system by a USB device, provided by embodiments of the invention.

PREFERRED MODES FOR CARRYING OUT THE INVENTION

The embodiments of the invention will be given a detailed description in accompanying with the drawings for making purpose, technical solution and advantage clearer.

Before discussing details, a brief description will be given of principle of communication between a USB device and a host.

The communication between a USB device and a host is that the host sends an instruction to a USB device and the USB device responses to the received instruction. Package is a basic unit of communication between the USB device and the host, which is classified as token package, data package and handshake package. Type of the package is dependent on PID.

The token package is in a format of SYNC+PID+ADDR+ENDP+CRC. Data package is divided into DATA0 and DATA1 and in case that size of data returned by the USB device is larger than size of the maximum output data package at the related endpoint, the returned data will be sent in batches and in general, DATA0 and DATA1 are sent alternatively. The handshake is in a format of SYNC+PID.

The USB device sends and receives data through its endpoints.

For example,

```
PID: SETUP    ADDR: 00  ENDP: 00  CRC5: 02   idle: 3
PID: DATA0    data: 80 06 00 01 00 00 40 00   CRC16: 94dd    idle: 7
PID: ACK   idle: 2ela
```

The aforesaid instruction discloses that the package is a setup package, data is 80 06 00 01 00 00 40 00, the handshake package is ACK, the setup package is sent by the host and the USB device receives the setup package and returns a response information to the host. For example,

```
PID: IN   ADDR: 00  ENDP: 00  CRC5: 02   idle: 7
PID: DATA1    data: 12 01 10 01 00 00 00 08   CRC16: 7711    idle: 7
PID: ACK   idle: 2e16
PID: OUT  ADDR: 00  ENDP: 00  CRC5: 02   idle: 3
PID: DATA1    data:    CRC16: 0000    idle: 7
PID: ACK   idle: 2e5a
```

The response data returned by the USB device to the host is 12 01 10 01 00 00 00 08. Notably, upon receiving the IN/OUT token package sent by the host, the USB device returns a response data to the host.

So the USB device finishes an information interaction with the host. Each information interaction is started by receiving a SETUP package from the host.

Embodiment 1

The embodiment discloses a method for identifying a host operating system by a USB device, including steps that the USB device determines type of the host operating system by analyzing the received instruction and returning related information to the host according to type of the operating system for exactly identifying and operating the USB device.

As shown in FIG. 1, the embodiment discloses a method for identifying a host operating system by a USB device, including steps as follows.

In Step 101, the USB device is powered on and initialized.

The USB device includes an information security device, such as a USB key, a card reader, a storage device, such as a U disk, a keyboard, a mouse and the like peripherals for a computer.

Specifically, the USB device is connected to the host by a USB bus and gets power supply from Vcc pin of the host.

The initializing step includes that the USB device initializes the power-on ID and operating system ID as a default ID.

Specifically, the step is initializing the power-on ID as a first preset value, the operating system ID as a default ID which is a fourth preset ID herein.

Both the first and fourth preset ids are self-defined, which respectively are 0 and 4.

Notably, the host operating system monitors insert-plug status of the USB device timely, enumerates the USB device upon checking a connection by the USB device. During the enumeration, the USB device receives a serial of setup packages, sent by the host, including a device descriptor obtaining instruction, a device address allocating instruction, a setting descriptor obtaining instruction, an endpoint descriptor obtaining instruction, and a setting selecting instruction, etc., and responses to them one by one. After the USB device returns the descriptors, endpoints and settings to the host, the host communicates with the host according to the negotiated protocol and endpoint by steps 102-117.

In Step 102, the USB device bus resets.

Specifically, the USB device receives a bus resetting instruction sent by the host and resets.

Notably, after the reset of the USB device bus, the default address of the USB device is enabled, and address 0 is set to transfer data and instructions between the USB device and the host.

In Step 103, the USB device determines whether it is powered on for the first time, if yes, Step 104 is executed, or if no, Step 105 is executed.

The determining whether the USB device is powered on for the first time includes determining whether the power-on ID is a first preset value, if yes, the USB device being powered on for the first time, or if no, the USB device being not powered on for the first time.

The power-on ID is a hardware ID in the USB device, able to change its value according to condition of power-on.

In Step 104, the USB device completes the enumeration according to a current operating system ID and Step 117 is executed.

Notably, the process that the USB device completes the enumeration according to the current operating system ID is different upon type of the USB device, and so is the enumeration. For example, in case that the USB device is a CCID device, the USB device performs operations, such as returning the device descriptors, the interface descriptors, and the endpoint descriptors, etc, to the host during the enumeration; or in case that the USB device is an HID device, it performs operations, such as returning the device descriptors, the descriptor set, the string descriptors, the endpoint descriptors, and the setting descriptors, etc, to the host.

In Step 105, in case the USB device receives a first setup package sent by the host, it determines whether the received setup package is a first preset instruction, if yes, Step 106 is executed, or if no, Step 109 is done.

Specifically, in case that the first preset instruction is a device descriptor obtaining instruction, the determining whether the first setup package is a device descriptor obtaining instruction includes determining whether the first setup package is an instruction starting with a hexadecimal number 80 06, if yes, the first setup package is a device descriptor obtaining instruction, or if no, the first setup package is not a device descriptor obtaining instruction.

In Step 106, the USB device determines whether the seventh byte of the first preset instruction is a second preset value, if yes, Step 107 is executed, or if no, Step 112 is executed.

In the embodiment, the second preset value is a hexadecimal number 0x08.

In Step 107, the USB device determines that the host operating system is a first operating system and sets the operating system ID to be a first preset id.

Specifically, the first operating system is an APPLE operating system Mac os, including Mac os x.

In case of an operating system Mac os x, the first setup package received by the USB device includes PID: SETUP    ADDR: 00  ENDP: 00  CRC5: 02   idle: 3
PID: DATA0    data: 80 06 00 01 00 00 08 00   CRC16: 94eb    idle: 7
PID: ACK   idle: 3a where data: 80 06 00 01 00 00 08 00 is a hexadecimal number, 0x01 refers to a device descriptor, the seventh byte 0x08 refers to obtaining 8 bytes of device descriptors. The first setup package received by the USB device is 80 06 00 01 00 00 08 00, which proves the operating system to be the first operating system.

Specifically, the first preset ID is self-defined, which is 1 herein.

In Step 108, the USB device returns a device descriptor to the host, claims itself a CCID device and Step 117 is executed.

For example, the device descriptor information returned by the USB device is 09 04 00 00 02 01 00 00 00, of which 0x01 identifies the device as a CCID device.

Notably, after returning device descriptor to host, the USB device performs rest of the enumeration, such as returning the interface descriptor and the endpoint descriptor to the host, and Step 117 is executed.

Notably, not all but one or more of the device descriptor, the interface descriptor, and the endpoint descriptor may be returned to the host, which is decided by settings of the USB device.

In Step 109, the USB device determines whether the first received setup package is a second preset instruction, if yes, Step 110 is executed, or if no, Step 112 is executed.

Specifically, the second preset instruction is a device address allocating instruction; determining whether the first received setup package is a device address allocating instruction includes determining whether the data of the first setup package starts with 00 05, if yes, the received setup package is the device address allocating instruction.

In Step 110, the USB device determines that the operating system is a second operating system and sets the operating system ID to be a second preset id.

Specifically, the second operating system is Linux 2.4 or Linux2.6 early kernel system.

The Linux 2.6 early kernel system includes Linux2.6.11 kernel system, Linux2.6.10 kernel system, and kernel system prior to Linux 2.6.

In case that the operating system is the second operating system, the first setup package received by the USB device includes PID: SETUP    ADDR: 00  ENDP: 00  CRC5: 02   idle: 3
PID: DATA0    data: 00 05 04 00 00 00 00 00   CRC16: 70eb    idle: 7
PID: ACK   idle: 2f where data: 00 05 04 00 00 00 00 00 is a hexadecimal number, which allocates a new address 0x04 to the USB device. Upon receiving the instruction, the USB device returns an empty data package in size of 0 to the host.

Specifically, the second preset ID is self-defined, for example, 2.

In Step 111, the USB device returns an interface descriptor, which does not include a description of number of its available endpoints, to the host and Step 117 is executed.

Specifically, upon determining that the host operating system is the second operating system, the USB device does not report additional endpoints in the endpoint descriptors being returned to the host, to the host.

For example, in case that the host operating system is a second operating system, the interface descriptor obtaining instruction received by the USB device is PID: SETUP    ADDR: 04  ENDP: 00  CRC5: 05   idle: 3
PID: DATA0    data: 80 06 00 04 00 00 09 00   CRC16: 04ae    idle: 7
PID: ACK   idle: 31 where data: 80 06 00 04 00 00 09 00 is a hexadecimal number, 0x04 refers to obtaining interface descriptor of the USB device and 0x09 to obtaining a 9-byte interface descriptor.

The interface descriptor returned by the USB device includes

PID: IN  ADDR: 04  ENDP: 00  CRC5: 05   idle: 7
PID: DATA1    data: 09 04 00 00 02 03 00 00   CRC16: a20a    idle: 7
PID: ACK   idle: 2c
PID: IN  ADDR: 04  ENDP: 00  CRC5: 05   idle: 6
PID: DATA0    data: 00  CRC16: 7581    idle: 7
PID: ACK   idle: 30

The interface descriptor returned by the USB device is 09 04 00 00 00 03 00 00 00, of which the fifth byte 0x00 reports to the host that there are not additional endpoints, and thus the USB device communicates with the host with a default endpoint 0.

Notably, upon returning an interface descriptor to the host, the USB device performs rest of the enumeration, and Step 117 is executed.

In Step 112, the USB device completes the enumeration according to the current default operating system ID and buffers a final setup package.

Specifically, the final setup package refers to a first instruction of the USB device following the descriptor obtaining instruction sent by the host.

The descriptor obtaining instruction sent by the host includes a device descriptor obtaining instruction, an interface descriptor obtaining instruction, an endpoint descriptor obtaining instruction, and a setting descriptor obtaining instruction.

Specifically, in case that the current default operating system ID points to a Windows operating system, the USB device claims itself an HID device to the system after the enumeration.

In case that the default operating system ID points to a Linux operating system, the USB device claims itself a USB device to the system after the enumeration.

In case that the default operating system ID points to a MACOSX operating system, the USB device claims itself a CCID device to the system after the enumeration.

Besides the above examples, the USB device also can claim itself another type of device such as a USB device, and a USB Mass storage, etc.

The default operating system is a fourth operating system and thus the USB device returns related information to the fourth operating system herein.

In Step 113, the USB device determines whether the final setup package received is a third preset instruction, if yes, Step 114 is executed, or if no, Step 116 is executed.

Specifically, the third preset instruction is a setting selecting instruction.

Specifically, determining whether the final setup package received is a setting selecting instruction includes determining whether the instruction starts with 00 09, if yes, the instruction is a setting selecting instruction.

For example, the final setup package received by the USB device is

| | |
|---|---|
| PID: SETUP    ADDR: 02  ENDP: 00  CRC5: 15   idle: 3 | |
| PID: DATA0      data: 00 09 01 00 00 00 00 00   CRC16: 2527     idle: 7 | |
| PID: ACK   idle: 2e1a | | where data: 00 09 01 00 00 00 00 00 is a setting selecting instruction.

In Step 114, the USB device determines that the host operating system is a third operating system and sets the operating system ID to be a third preset id.

Specifically, the third operating system is an after-Linux2.6 kernel system, including Linux 2.6.18 and Linux 2.6.28.

Specifically, the third preset ID is a self-defined value, such as 3.

In Step 115, the USB device executes soft power off, sets the power-on ID to be the third preset value, and Step 102 is executed.

Before description of the soft power-off, it is noted that the USB device reports its insert-plug status to the host by changing status of a pull-up resistor of Vcc (power voltage or working voltage) pin of the host, and the pull-up resistor is integrated into the USB device, which is not connected to Vcc pin in a default status while being connected to a Vcc pin in case that a connection is established between the USB device and the host, so that the host determines whether a USB device is connected to it by detecting the status change of the pull-up resistor of the Vcc pin.

The soft power-off specifically includes that the USB device receives a power-off instruction sent by the host and closes connection between a pull-up resistor inside of it and Vcc pin, and then the host operating system monitors that the USB device is plug out, however the USB device is still connected to and gets power supply from the Vcc pin, and therefore the USB device is still in a power-on status; after being powered off for a predetermined time period (a short time period), the USB device receives a power-on instruction sent by the host, and is connected to the Vcc pin via a pull-up resistor inside of it, and the host operating system monitors that the USB device is inserted again and repeats enumeration, which is that the USB device returns to Step 102.

Specifically, the third preset value is a self-defined value, for example, 3.

Notably, after determining that the host operating system is the third operating system, the USB device executes a soft power-off operation and repeats enumeration, this is because the USB device has completed the enumeration before determining that the host operating system is the third operating system, and returned descriptors according to the default operating system, i.e. the fourth operating system, and so comparing to the determination that the host operating system is the third operating system, the above returned descriptors are wrong, and thus the USB device needs a soft power-off, and returns descriptors according to the determination that the host operating system is the third operating system.

In Step 116, the USB device determines that the host operating system is the fourth operating system and sets value of the operating system ID to be the fourth preset id.

For example, the fourth operating system is Window operating system, including Windows 98, Windows 2000, Windows XP, Windows Vista or Windows 7.

Notably, in case that the host applies the fourth operating system, the final setup package received by the USB device is a setting instruction, for example 80 06 02 03 09 04 ff 00, which refers to obtaining a descriptor with an index of 2 strings.

Specifically, the fourth preset ID is a self-defined value, for example 4.

Notably, upon determining that the host operating system is the fourth operating system, the USB device does not execute soft power off, but completes enumeration and waits for APDU instruction from the host, because the USB device sets the fourth operating system to be the default operating system, and during the enumeration, it enumerates according to the fourth operating system, and returns a correct descriptor to the host, and thus avoids a repeat enumeration.

In Step 117, the USB device communicates with the host and waits for APDU instructions sent by the host.

Notably, in Step 101, in case that the USB device initializes the operating system ID as the third preset id, it executes soft power off in Step 116, sets the power-on ID to be the third preset value and returns to Step 102, avoids soft power off in Step 115, and before executing Step 117, the USB device determines whether the current operating system ID is identical to the default operating system id, if yes, it returns answer information to the host according to the current operating system ID and Step 117 is executed, or if no, it executes a soft power off, sets the power-on ID to be the third preset value and Step 102 is executed.

Notably, in case that the USB device determines that the host operating system is the first operating system, it returns number of available endpoints to the host according to its settings after receiving an interface descriptor sent by the host.

For example, in case that the USB device has two available endpoints, it returns an interface descriptor 09 04 00 00 02 03 00 00 00 to the host, of which the fifth byte Ox02 reports two available endpoints to the host.

For another example, in case that the USB device has not additional available endpoint, it returns an interface descriptor 09 04 00 00 00 03 00 00 00 to the host, of which the fifth byte Ox00 reports unavailable endpoint to the host, and at this time, the USB device communicates with the host by the default endpoint 0.

In case that the USB device determines that the host applies the third operating system, it returns an interface descriptor which does not include endpoint information, such as 09 04 00 00 00 03 00 00 00 to the host.

Notably, in case that the USB device is an optical disk, it returns specific data to the host according to the type of the determined operating system upon receiving an instruction for reading contents of the optical disk sent by the host in a process of communication with the host.

The instruction for reading contents of the optical disk, received by the USB device is a standard SISC instruction, for example, 55 53 42 43 b0 94 f0 85 00 08 00 00 080 00 0a 28 00 00 00 00 11 00 00 01 00 00 00 00 00 00 00.

In case of a determination that the host operating system is the first operating system, the USB device returns data 02 43 44 30 30 31 01 00 00 57 00 69 00 6e 00 33 00 32 00 20 00 20 00 20 00 20 00 20 00 20 00 20 to the host upon receiving the above instruction.

In case of a determination that the host operating system is the second or third operating system, the USB device returns 03 43 44 30 30 31 01 00 00 57 00 69 00 6e 00 33 00 32 00 20 00 20 00 20 00 20 00 20 00 20 00 20 to the host upon receiving the above instruction.

In case of a determination that the operating system is the fourth operating system, the USB device returns 01 43 44 30 30 31 01 00 00 57 00 69 00 6e 00 33 00 32 00 20 00 20 00 20 00 20 00 20 00 20 00 20 to the host upon receiving the above instruction.

The USB device determines any type of the operating system by analyzing instructions sent by the host and returns corresponding data to the host, which makes the host identify the USB device efficiently.

The above-mentioned are just preferred embodiments of the invention, not a limit to the invention, all modifications, substitutions or improvements in the principle of the invention will be protected by the invention.

The invention claimed is:

1. A method for identifying a host operating system by a USB device, wherein it comprises
    Step A, the USB device being powered on and initialized;
    Step B, determining whether a first setup package received is a first preset instruction by the USB device, if yes, Step C being executed, or if no, Step D being executed;
    Step C, determining whether the seventh byte of the first preset instruction is a second preset value by the USB device, if yes, setting an operating system ID to be a first preset ID by the USB device, and Step F being executed, or if no, Step E being executed;
    Step D, determining whether the first setup package is a second preset instruction by the USB device, if yes, setting the operating system ID to be a second preset ID by the USB device, and Step F being executed, or if no, Step E being executed;
    Step E, keeping interaction and communication with a host according to a default operating system ID till receiving a final setup package by the USB device, determining whether the final setup package is a third preset instruction by the USB device, if yes, setting the operating system ID to be a third preset ID by the USB device; or if no, setting the operating system ID to be a fourth preset ID by the USB device; and
    Step F, interacting and communicating with the host according to the current operating system ID and waiting for receiving instruction sent by the host by the USB device.

2. The method of claim 1, wherein the USB device being initialized comprises initializing a power-on ID to be a first preset value, and initializing the operating system ID to be a default ID.

3. The method of claim 2, wherein Step F further comprises determining whether the current operating system ID is identical to the default ID by the USB device, if yes, establishing communication with the host and waiting for instructions sent by the host by the USB device, or if no, performing soft power-off and setting the power-on ID to be a third preset value by the USB device and Step A being executed.

4. The method of claim 3, wherein after Step A, the method further comprising determining whether the USB device is powered on for the first time, if yes, Step B being executed, or if no, Step F being executed.

5. The method of claim 4, wherein the determining whether the USB device is powered on for the first time comprises determining whether the power-on ID is the first preset value, if yes, the USB device being powered on for the first time; or if no, the USB device being not powered on for the first time.

6. The method of claim 1, wherein the first preset instruction is a device descriptor obtaining instruction.

7. The method of claim 6, wherein the USB device determining whether the first setup package is the first preset instruction comprises that the USB device determines whether the first setup package starts with a hexacademical number 80 06, if yes, the first setup package is the first preset instruction, or if no, the first setup package is not the first preset instruction.

8. The method of claim 1, wherein the second preset value is a hexacademical number Ox08.

9. The method of claim 1, wherein the second preset instruction is a device address allocating instruction.

10. The method of claim 9, wherein the USB device determining whether the first setup package is the second preset instruction comprises that the USB device determines whether the first setup package starts with a hexadecimal number 00 05, if yes, the first setup package is the second preset instruction, or if no, the first setup package is not the second preset instruction.

11. The method of claim 1, wherein the final setup package is the first instruction received by the USB device after the USB device completes receiving descriptor obtaining information.

12. The method of claim 11, wherein the descriptor obtaining information comprises a device descriptor obtaining instruction, an interface descriptor obtaining instruction, an endpoint descriptor obtaining instruction, and a setting descriptor obtaining instruction.

13. The method of claim 1, wherein the third preset instruction is a setting selecting instruction.

14. The method of claim 13, wherein the USB device determining whether the final setup package is the third preset instruction comprises that the USB device determines whether the final setup package starts with a hexadecimal number 00 09, if yes, the final setup package is the third preset instruction, or if no, the final setup package is not the third preset instruction.

15. The method of claim 1, wherein the method further comprises that the first preset ID refers to a first operating system, the second preset ID refers to a second operating system, the third preset ID refers to a third operating system, and the fourth preset ID refers to a fourth operating system.

16. The method of claim 15, wherein the first operating system is an APPLE operating system, the second operating system is a LINUX 2.4 kernel system, or a LINUX 2.6.10 kernel system or its old version, the third operating system is after-LINUX 2.6.10 kernel system, and the fourth operating system is a WINDOWS operating system.

* * * * *